United States Patent Office

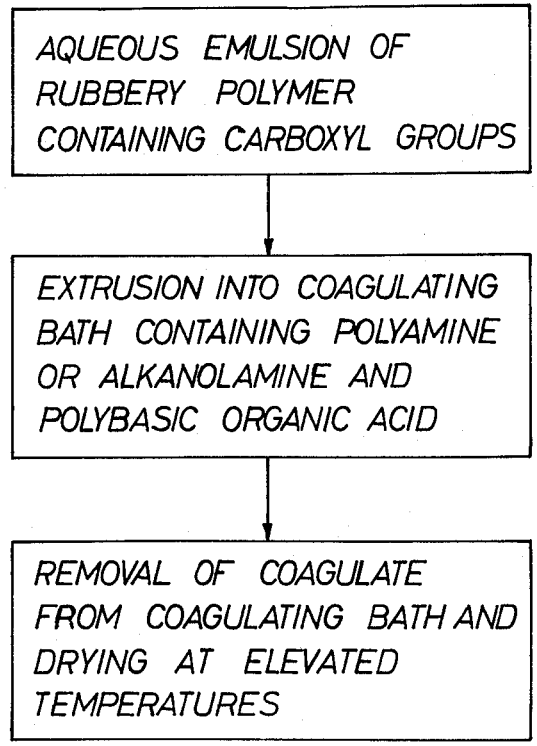

2,961,290
Patented Nov. 22, 1960

2,961,290

PROCESS FOR THE PRODUCTION OF RUBBER-LIKE SHAPED ELEMENTS FROM RUBBERY POLYMERS CONTAINING CARBOXYL GROUPS

Gunter Kolb, Koln-Stammheim, Germany, assignor to Farbenfabriken Bayer Aktiengesellschaft, Leverkusen, Germany, a corporation of Germany Filed Nov. 27, 1957, Ser. No. 699,180

Claims priority, application Germany Dec. 1, 1956

10 Claims. (Cl. 18—54)

The present invention relates to a process of producing rubber-like shaped elements from rubbery polymers containing carboxyl groups. In my copending application Serial No. 538,781, filed on October 5, 1955, I have disclosed a process for the production of elastic shaped elements, such as filaments, foils, webs or impregnations from aqueous emulsions of synthetic elastomeric polymers which contain free carboxyl groups, according to which process these emulsions are introduced into a precipitation bath containing polyfunctional compounds which are able to react with the carboxyl groups of the polymers, such as for example polyamines. The bath also advantageously contains electrolytes such as for example calcium chloride.

The shaped elements obtained by this process have excellent technological properties, such as high tensile strength and high elongation.

Where these elastic shaped elements are subjected during use to permanent stressing with elongation, there is found the disadvantage that the elastic shaped element has a cold flow, i.e. that the shaped element, such as for example a thread, is stretched by a measurable percentage when subjected to a tensile stress with a constant tensile force lasting several hours, this stretching may result in difficulties in certain technical applications.

It has now been found that this disadvantage can be obviated if synthetic elastomers containing acid groups are used in the form of their aqueous emulsions for the production of shaped elements according to the aforementioned process and if, for coagulation the emulsions, polybasic organic acids are used as well as the polyfunctional organic compounds which are able to react with the acid groups of the synthetic elastomers. Suitable synthetic elastomers containing carboxyl groups are disclosed in my copending application Serial No. 538,-781, filed on October 5, 1955. Such synthetic elastomers are for example polymers of butadiene-carboxylic acids or copolymers of butadiene, its homologues or derivatives with polymerisable unsaturated compounds which contain free carboxyl groups, or even with compounds from which the carboxyl groups can subsequently be liberated. By the homologues and derivatives of butadiene, there are to be understood in the present case, for example isoprene, 2,3-dimethyl butadiene, 2-chlorobutadiene. Acrylic acid, methacrylic acid, sorbic acid, maleic acid, maleic ester acids and fumaric acid are for example suitable as polymerisable unsaturated compounds with free carboxyl groups.

These monomers or monomer mixtures are polymerized by known methods in aqueous emulsion in the presence of emulsifiers with the aid of the known radical-forming substances, such as for example potassium persulphate. It is advantageous to use rubbery polymers which contain about 0.2 to 20 g. of carboxyl groups per 100 parts by weight. The emulsions contain preferably 10–60 percent by weight of polymers.

The cross-linking of the butadiene polymers containing carboxyl groups is effected by reaction with polyvalent organic compounds which are able to react with the carboxyl groups of the polymers. As such, there are to be understood polyamines, amino alcohols and their salts with monobasic organic acids and with inorganic acids as they are disclosed in my copending application Serial No. 538,781. As polyamines there come preferably into question organic compounds which contain at least two nitrogen atoms each having bonded at least one hydrogen atom such as ethylenediamine, butylenediamine, hexanemethylenediamine, diethylenetriamine, dipropylenetriamine, triethylenetetramine, tripropylenetetramine, hexamethylenepentamine, hydrazine. Suitable alkanolamines are such which contain at least two hydrogen atoms, as for instance ethanolamine, diethanolamine, triethanolamine, ethanolmonomethylamine.

Suitable polybasic organic acids are for example: maleic acid, fumaric acid, itaconic acid, oxalic acid, succinic acid, glutaric acid, adipic acid, tartaric acid, citric acid, malonic acid, dimethylmalonic acid, sebacic acid, phthalic acid, terephthalic acid, isophthalic acid, dihydrophthalic acid, tetrahydrophthalic acid, hexahydrophthalic acid, benzene tri-, tetra-, penta- and hexacarboxylic acids, cyclohexane tricarboxylic acid, pyridine-$\alpha$-$\beta$-dicarboxylic acid, diphenic acid, p,p'-diphenyl dicarboxylic acid, naphthalene polycarboxylic acids such as naphthalic acid, napthalene-1,4-dicarboxylic acid, naphthalene 1,4,5,8-tetracarboxylic acid, triphenyl methanepolycarboxylic acids, ethylenediaminotetraacetic acid, aminotriacetic acid, polysulfonic acids of benzene and polynuclear hydrocarbons, such as benzene di- and trisulfonic acid, phenol-disulfonic acids, naphthalene and naphthol polysulfonic acids, such as 1-naphthol-2,4-disulfonic acid, 1-naphthol-3,6-disulfonic acid, 1-naphthol-3,6-disulfonic acid, 2-naphthol-3,6-disulfonic acid, 1-naphthol-2,4,7-trisulfonic acid, 2-naphthol-3,6,8-trisulfonic acid, 1-naphthylamine disulfonic acids, 2-naphthylaminedisulfonic acids, anthraquinone polysulfonic acids, phenanthrenedisulfonic acids, polybasic acids containing carboxyl and sulfonic acid groups such as benzoic acid-sulfonic acid(2), benzoic acid-sulfonic acid(4), naphthoic acid(1)-sulfonic acid(2), phthalic acid-sulfonic acid(3). If the polyvalent organic acids are used, the shaped articles surprisingly no longer show any cold flow after the cross-linking, and there is in addition obtained an increase in the tensile strength to more than double the value with high elongations.

Sulphur and vulcanization accelerators can also be added to the polymer emulsions used for the process in order to produce a conventional sulphur vulcanization as well as the cross-linking by way of the polyvalent organic compounds. It is likewise possible for natural rubber latex or plastic dispersions, and also plasticisers, filler, pigments and the like, to be added to the polymer emulsions.

For carrying the process into effect, it is possible to use the same conditions as those disclosed in my copending application Serial No. 538,781, filed on October 5, 1955. It is a further feature of the invention that, where using these conditions, it is advantageous in the precipitation baths to dispense with the addition of inorganic compounds of polyvalent metals such as the salts, oxides or hydroxides of polyvalent metals.

As to the composition of the coagulation baths preferably water or alcohols such as methanol, ethanol or mixtures of water with alcohols may be used as solvents, although the invention is not restricted to the use of such solvents. The amount of cross-linking agents applied may vary within wide limits. Preferably amounts of a cross-linking agent should be utilized sufficient to react with at least 1/10 of the reactive groups. Good results are also obtained if the amount of cross-linking agents is at least chemically equivalent to the reactive groups present in the polymers. For achieving this result the coagulating bath should preferably contain 1–50 percent by weight of cross-linking agent, and 1–50, preferably 5–15 percent by weight, of polybasic organic acid, although higher concentrations are also applicable. Besides the cross-linking agents and the polybasic acids, the coagulating bath may contain coagulating agents as for instance strong electrolytes such as sodium chloride, potassium chloride, sodium sulphate in amounts of about 1–30 percent by weight. The pH value of the coagulating bath is preferably kept at about 5–12, preferably 8–10. The precipitation baths may also contain thickening agents such as polyvinyl-alcohol, salts of polyacrylic acid, alginic acid, carboxymethylcellulose which are soluble in water or alcohol, casein, gelatin, agar-agar in concentration of about 1–15 percent by weight. The temperature of the coagulation bath depends on the reactivity of the components applied. Generally speaking it may be kept at temperatures of about 20–70° C.

After leaving the coagulation bath, the coagulated articles may be washed with water or alcohol in order to remove a surplus of coagulating agents adhering to the coagulates. The temperature of the washing agents is kept at about 20–70° C. Finally the shaped coagulate is dried at temperatures of about 50–150° C., preferably 90–120° C.

The process of this invention is illustrated in the drawing which is in the form of a flow sheet and points out the essential steps in the invention.

The process is particularly suitable for the production of threads from aqueous emulsions of butadiene copolymers which contain carboxyl groups. These emulsions are introduced through a nozzle into the precipitating bath. A thread which is ready for use is obtained immediately after the emulsion has entered the precipitating bath, it only being necessary for the said thread to be washed, dried and reeled. This thread shows excellent tensile strength values with high elongation only a short time after being dried, such as could not be formerly obtained with butadiene-containing polymers even from solutions. It is obvious that the copolymer emulsions may have added thereto the conventional vulcanization auxiliaries, such as sulphur and accelerators. The threads may also be heated to a temperature higher than that of the actual drying process, whereupon additional cross-linking may take place. Such after-treatments may also be carried out under tension or with additional shaping. The butadiene-acrylonitrile copolymers which contain free carboxyl groups present an excellent resistance to solvents and have a high tensile strength and a high resistance to ageing and heat.

The copolymer emulsions which have been described may of course also have added thereto other natural or synthetic rubber latices or plastic emulsions, fillers, plasticisers, resins, dyestuffs, pigments, solvents or other high polymers capable of being cross-linked in accordance with the same principle. Examples of such high polymers are polyacrylic acids, carboxy methyl cellulose, alginic acid, protein compounds such as casein, furthermore polyesters, etc.

The mode of carrying out the present invention may be varied within very wide limits. Instead of producing threads, webs or films, it is for example also possible to produce hoses by the use of annular nozzles. Moreover, the working up and drying of the shaped coagulates which are obtained may be modified in practically any desired manner, it being of course always necessary to bear in mind the nature of the polymer to be used. Another possibility is for textile filaments of natural or synthetic nature to be impregnated with the above described polymer emulsions and introduced into a coagulation bath which contains suitable polyfunctional compounds. Furthermore, textile threads may be caused to pass through a nozzle into the above described coagulation bath simultaneously with the emulsion, whereby threads or filaments with a core of textile fibres are obtained. The process can also be carried out in such manner that the latex or solution is applied as a thin layer on to a firm surface, for example a mould, metal plate or a rotating roller or is introduced into a rotating mould and is then if desired continuously coagulated and thereafter cross-linked. Furthermore, impregnations in or on leather, textile materials and paper fleeces may be carried out by using an analogous working method.

As already mentioned, the threads or moulded bodies manufactured according to the present process show a surprisingly high strength shortly after entering the precipitation bath. This ensures a technically saisfactory working up operation. In addition owing to the high strength value of the threads which are obtained, the withdrawal velocity can be adjusted to a very high value. Whereas according to processes hitherto known withdrawal velocities of 1 metre per minute were achieved the present process allows of using a withdrawal velocity of about 20–60 metres per minute. It is surprising that emulsions of comparatively low concentration containing 10–40 percent by weight of polymer can also be used for carrying this process into effect. It is of course also possible for the viscosity of the emulsions to be increased by suitable additives prior to preparation. The high strength value also permits the production of very thin threads, having diameters of 0.06–0.2 mm., the preparation of which from emulsions formerly presented difficulties.

It is further to be emphasized that the formerly necessary vulcanization can be dispensed with in connection with the polymers containing butadiene. In connection with the diene-free polymers, an increase in strength is produced by the process which is employed, the said increase being such as could otherwise only be obtained by complicated known after-treatment processes, for example with peroxides.

In the following examples the parts indicated are parts by weight:

EXAMPLE 1

6600 parts of butadiene, 2600 parts of acrylonitrile and 800 parts of maleic acid monobutyl ester are emulsified in a solution of 250 parts of the sodium salt of a paraffin sulphonic acid with about 12–18 carbon atoms in 14200 parts of water and 200 parts of N/1 sulphuric acid and polymerized while stirring at 15° C. after adding 40 parts of N-dodecyl mercaptan and 40 parts of the sodium salt of a paraffin sulphinic acid with about 12–18 carbon atoms. A yield of 80% is obtained after 20 hours. The polymerization is stopped by adding 60 parts of sodium hydrosulphite, 2 percent (based on the monomers) of the usual stabilisers, such as phenyl-β-naphthyl amine, are added and gas is removed from the preparation by steam distillation of the residual monomers.

Further suitable stabilizers are condensation products of cresols and camphene (as disclosed in German specification 756,873), 2,6,ditert.butyl-p-cresol, aralkylated products of diphenylamines (compare German specification 895,973), 2.2'-methylene-bis-(4-methyl-6-cyclohexylphenol). These compounds may be applied in quantities of 0.5–5 percent as calculated on the weight of the polymers contained in the latices.

The emulsion thus obtained can be introduced at a constant hydrostatic pressure upwardly through a nozzle into coagulation baths, the compositions of which are indicated in the following table. The coagulation filaments which are formed are withdrawn over a synchronously running roller system, and then washed and dried. Filaments which can be used immediately are then obtained.

EXAMPLE 2

The emulsion according to Example 1 is initially caused to flow through a nozzle into a solution of 150 parts of citric acid and 65 parts of ethylene diamine in 3000 parts of water (pH value 5.2). The coagulated filament is aftertreated in a solution of 170 parts of citric acid and 180 parts of ethylene diamine in 15000 parts of water (pH value 9.5), washed and dried. The elastic filament thus obtained shows the following technological values:

| | |
|---|---|
| Tensile strength in kg./cmm | 560 |
| Elongation in percent | 920 |
| Thickness in mm | 0.22 |
| Cold flow in percent | 9 |

Further suitable copolymers for carrying out the process as illustrated in the examples are copolymers of: 1 part of butadiene, 0.3 part of styrene and 0.1 part of maleic monobutyl ester; 1.2 parts of butadiene, 0.15 part of methacrylic acid methyl ester, 0.15 part of maleic acid monobutyl ester; 1.2 parts of butadiene, 0.15 part of acrylonitrile and 0.75 part of methacrylic acid; 5.7 parts of butadiene, 3.5 parts of acrylonitrile and 0.8 part of maleic monocyclohexyl ester; 6.5 parts of butadiene, 2.5 parts of methacrylic acid methyl ester and 1 part of maleic acid monocyclohexyl ester; 3 parts of butadiene, 2.5 parts of acrylonitrile, 3.5 parts of methacrylic acid methyl ester and 1 part of maleic acid monobutyl ester; 7 parts of butadiene, 1 part of acrylonitrile, 1.25 parts of styrene, 5 parts of maleic acid monobutyl ester and 0.25 part of methacrylic acid.

Table

| Composition of the precipitation baths | 1 | 2 | 3 | 4 | 5 | 6 | 7 | 8 |
|---|---|---|---|---|---|---|---|---|
| Water | 3,500 | 3,500 | 3,500 | 3,500 | 3,500 | 3,500 | 3,500 | 3,500 |
| Calcium chloride in g | 350 | | | | | | | |
| Sodium chloride in g | | 560 | | | | | | |
| Concentrated hydrochloric acid in g | | | 50 | | | | | |
| Formic acid in g | | | | 100 | | 15 | | |
| Tartaric acid in g | | | | | 150 | | | |
| Citric acid in g | | | | | | 150 | 114 | |
| Adipic acid in g | | | | | | | | 170 |
| Ethylene diamine in g | 120 | 120 | 50 | 150 | 175 | 175 | 91 | 150 |
| pH value of the precipitation baths | 12.2 | 12.3 | 10.5 | 9.2 | 10.3 | 10.3 | 9.7 | 9.6 |
| Tensile strength of the filaments in kg./cm.² | 740 | 43 | 45 | 145 | 287 | 375 | 648 | 315 |
| Elongation of the filaments in percent | 760 | 550 | 660 | 660 | 650 | 760 | 960 | 680 |
| Thickness of the filaments in mm | 0.18 | 0.3 | 0.16 | 0.26 | 0.23 | 0.21 | 0.17 | 0.23 |
| Cold flow of the filaments in percent | >100 | breakage | 7 | 11 | 5 | 5 | 15 | |

It can be seen from the above data that the cold flow of the elastic rubber filaments drops to small percentages when the organic acids are added and that the tensile strength values on introducing polybasic acids are suddenly increased with corresponding elongations.

What I claim is:

1. A process for the production of a rubber-like shaped article which comprises contacting an aqueous emulsion of a synthetic rubbery polymer containing carboxyl groups, in shaped form, in a coagulating bath containing a cross-linking agent selected from the group consisting of a polyamine and an alkanolamine as well as a polybasic organic acid to form a coagulate containing said cross-linking agent and said polybasic organic acid in a quantity sufficient to effect cross-linkage of said polymer by reaction of the carboxyl groups with said cross-linking agent, removing said coagulate from the coagulating bath, and then drying said coagulate at a temperature of about 50° C. to 150° C. to effect cross-linkage of said polymer, the presence of the polybasic organic acid serving to reduce the cold flow of the shaped article.

2. Process of claim 1 wherein the coagulating bath contains salts of monovalent metals as electrolytes, the latter having a further coagulating action on the polymer.

3. Process of claim 1 wherein said polybasic organic acids are of low molecular weight.

4. Process of claim 1 wherein the polybasic organic acids are polybasic sulfonic acids of low molecular weight.

5. Process of claim 1 wherein the polybasic organic acids contain both carboxyl and sulfonic acid groups.

6. Process of claim 1 wherein the polymers are introduced through nozzles into the coagulating bath.

7. Process of claim 1 wherein the polymers are introduced into a coagulating bath while in contact with a firm support.

8. Process of claim 1 wherein the coagulating bath has a pH value of about 8–12.

9. A process for the production of a rubber-like shaped article which comprises contacting an aqueous emulsion of a synthetic rubbery polymer containing carboxyl groups, in shaped form, in an aqueous coagulating bath with a cross-linking agent selected from the group consisting of a polyamine and an alkanolamine, said coagulating bath having a pH of about 8–12 and also containing a polybasic organic acid, said synthetic rubbery polymer being a copolymer of a conjugated diolefin of 4–6 carbon atoms and further ethylenically unsaturated monomers, at least part of which contain carboxyl groups, said rubbery polymers containing about 0.2–20 grams of carboxyl groups per 100 grams of rubbery polymer, maintaining the synthetic rubbery polymer in said bath for a time sufficient to permit said cross-linking agent to react with the carboxyl groups of the polymer so as to coagulate the latter, removing said coagulate from the coagulating bath, and then drying said coagulate at a temperature of about 50° C. to 150° C., the presence of the polybasic organic acid in the bath serving to reduce the cold flow of the shaped article.

10. Process of claim 9 wherein the aqueous polymer emulsion is withdrawn from the coagulating bath at a velocity of about 20–60 meters per minute.

References Cited in the file of this patent

UNITED STATES PATENTS

| | | |
|---|---|---|
| 2,131,982 | Shepherd | Oct. 4, 1938 |
| 2,203,387 | James | June 4, 1940 |
| 2,227,277 | Shepherd | Dec. 31, 1940 |
| 2,288,982 | Waterman et al. | July 7, 1942 |
| 2,369,191 | Thurmond | Feb. 13, 1945 |
| 2,849,426 | Miller | Aug. 26, 1958 |